US008255346B2

(12) United States Patent  
Abe et al.

(10) Patent No.: US 8,255,346 B2  
(45) Date of Patent: Aug. 28, 2012

(54) METHODS AND SYSTEMS FOR VARIABLE GROUP SELECTION AND TEMPORAL CAUSAL MODELING

(75) Inventors: Naoki Abe, Yorktown Heights, NY (US); Yan Liu, Yorktown Heights, NY (US); Aurelie C. Lozano, Yorktown Heights, NY (US); Saharon Rosset, Tel Aviv (IL); Grzegorz Swirszcz, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 12/616,534

(22) Filed: Nov. 11, 2009

(65) Prior Publication Data

US 2011/0112998 A1 May 12, 2011

(51) Int. Cl.
*G06F 15/18* (2006.01)
*G06F 7/60* (2006.01)
*G06F 17/50* (2006.01)

(52) U.S. Cl. .................. 706/15; 706/19; 706/25; 703/2; 703/13

(58) Field of Classification Search .................. None
See application file for complete search history.

(56) References Cited

U.S. PATENT DOCUMENTS

| 5,640,491 | A | * | 6/1997 | Bhat et al. ........................ 706/25 |
| 2005/0234718 | A1 | | 10/2005 | Ouim |
| 2006/0224534 | A1 | * | 10/2006 | Hartman et al. ................ 706/15 |

OTHER PUBLICATIONS

Yuan et al., "Model selection and estimation in regression with grouped variables", J.R. Statist. Soc. B, 68, Part I, pp. 49-67, 2006.
Granger, "Investigating Causal Relations by Econometric Models and Cross-spectral Methods", Econometrica vol. 37, No. 3 (Aug. 1969(, pp. 424-438.
Sambo et al., "CNET: an algorithm for Reverse Engineering of Casual Gene Networks", Bioinformatics Methods for Biomedical Complex Systems Applications, 8th workshop on Network Tools and Applications in Biology NETTAB2008, Varenna, Italy.
Whitfield et al., "Identification of Genes Periodically Expressed in the Human Cell Cycle and Their Expression in Tumors", Molecular Biology of the Cell, vol. 13, pp. 1977-2000, Jun. 2002.
Tibshirani, "Regression Shrinkage and Selection via the Lasso", Journal of the Royal Statistical Society, Series B (Methodolgical), vol. 58, No. 1, (1996), pp. 267-288.

* cited by examiner

*Primary Examiner* — Alan Chen
(74) *Attorney, Agent, or Firm* — Scully, Scott, Murphy & Presser, P.C.; Daniel P. Morris, Esq.

(57) ABSTRACT

A "variable group selection" system and method in which constructs are based upon a training data set, a regression modeling module that takes into account information on groups of related predictor variables given as input and outputs a regression model with selected variable groups. Optionally, the method can be employed as a component in methods of temporal causal modeling, which are applied on a time series training data set, and output a model of causal relationships between the multiple times series in the data.

23 Claims, 9 Drawing Sheets

METHODS AND SYSTEMS FOR VARIABLE GROUP SELECTION AND TEMPORAL CAUSAL MODELING

BACKGROUND OF THE INVENTION

The need for efficient and effective methods of variable group selection in regression analysis is increasingly recognized. In many applications of data analytics, a natural grouping structure exists between variables. It is desirable to select variable groups, rather than individual variables, for better prediction and interpretability. For use in decision support, understanding the relationships between groups of variables is often more relevant. The following represents examples of relevant applications:

In infrastructure analytics, it is advantageous to group variables by functions, e.g. treat CPU related variables as a group, memory related variables as another group, etc.

In micro-array data analysis, genes belonging to the same functional group or to the same gene cluster may be grouped for more robust and meaningful analysis.

Of particular importance is the fact that group variable selection is a critical component of temporal causal modeling methods, in which it is desirable to discover causal/dependency relationship between time series rather than individual lagged variables.

Furthermore, group variable selection is also an important component in spatial temporal causal modeling, in which it is desired to discover causal/dependency relationship between spatial temporal features, assuming values at different points in space and time.

In these settings, selecting the right groups of variables is often more relevant to the subsequent use of estimated models, which may involve interpreting the models and making decisions based on them.

Recently, several methods have been proposed to address this variable group selection problem, in the context of linear regression (for example, Yuan, M., Lin, Y., Model selection and estimation in regression with grouped variables, J. R. Statist. Soc. B, 68, 4967, 2006). These methods are based on extending the Lasso formulation (Tibshirani, R., Regression shrinkage and selection via the lasso, J. Royal, Statist. Soc B., 58(1), 267-288, 1996) by modifying the regularization penalty term to account for the group structure. Hence, these existing methods do not adequately address the problem of variable group selection in presence of non-linearity in the data. The relatively high computational requirement of these existing methods has also been a hindrance to the application to real world problems having hundreds and thousands of variables.

SUMMARY

The present invention relates to an improved method and system for performing "variable group selection" in which constructs are based upon a training data set, a regression modeling module that takes into account information on groups of related predictor variables given as input and outputs a regression model with selected variable groups.

In one aspect, the method can be employed as a component in methods of temporal causal modeling, which are applied on a time series training data set, and output a model of causal relationships between the multiple times series in the data.

In a further aspect, there is provided a methods and system of variable group selection for predictive and causal modeling applied to a chosen data set. The method, in one aspect, is a computer-implemented method of variable group selection comprising: providing at a computer device, a training data set for which a predictive model is to be generated; iteratively selecting from among a plurality of variables of the data set, one or more variable groups minimizing a residual error in each iteration; and in each iteration, selecting a variable group with respect to the minimization of residual error of an updated estimated predictive model when the selected variable group is included in the predictive model in addition to those variable groups that have been selected in earlier iterations; and, performing a regression by an arbitrary component regression method using the selected variable groups selected in each iteration, wherein a program using a processor unit runs one or more the iteratively selecting and performing step.

In another aspect, the method may additionally comprise "iterative re-estimation" of the estimated coefficients of the current model, i.e. upon selection of the variable groups in each iteration the model coefficients are re-estimated.

In a further aspect of the invention, there is provided a system, method and computer program product implemented by a computer for temporal causal modeling. The method comprises: providing, at a computer system, a data set comprising a number of time series data; and creating, from the data set, data for variables corresponding to a number of relative past time steps for each time series; grouping the variables according to a time series they belong to; and applying a variable group selection method by iteratively choosing a target time series and selecting the time series that are considered to be causing the target time series, and, at each iteration: selecting from among the variables of the data set one of a plurality of variable groups minimizing a residual error in each iteration; and in each iteration, selecting a variable group with respect to the minimization of residual error of an updated estimated predictive model when the selected variable group is included in the predictive model in addition to those variable groups that have been selected in earlier iterations; and, performing regression by an arbitrary component regression method using the selected variable groups so far in each iteration, wherein a program using a processor unit runs one or more the creating, grouping, iteratively choosing and selecting and performing step.

In a further aspect of the invention, there is provided a method implemented by a computer for spatial temporal causal modeling. The method comprises: providing, at a computer system, a data set comprising a number of spatial temporal data; creating, from the data set, data for variables corresponding to a number of relative past time steps and a number of relative spatial neighbors for each spatial temporal series; and grouping the variables according to the spatial temporal series they belong to; and applying a variable group selection method by iteratively choosing a target spatial temporal measurement and selecting the spatial temporal measurements that are causing the target spatial temporal measurement, and, at each iteration: selecting from among the variables of the data set one of a plurality of variable groups minimizing a residual error in each iteration; and in each iteration, selecting a variable group with respect to the minimization of residual error of an updated estimated predictive model when the selected variable group is included in the predictive model in addition to those variable groups that have been selected in earlier iterations; and, performing regression by an arbitrary component regression method using the selected variable groups so far in each iteration, wherein a program using a processor unit runs one or more the creating, grouping, iteratively choosing, selecting and performing steps.

The method and system of spatial temporal causal modeling, in another aspect, may apply a certain data transformation at each iteration employed for the variable group selection method. This step of applying a data transformation comprises: a) expanding data for the target variable by concatenating a vector of zeros whose size equals the number of lagged explanatory variables; and b) multiplying the data for the explanatory variables by a first data matrix for controlling a spatial decay behavior of regression coefficients and expanded by a constant times an identity matrix; and c) applying a variable group selection method to a resulting transformed data; and d) scaling estimated regression coefficients by multiplying by a second data matrix that bears a certain relationship to the first data matrix.

A program storage device readable by a machine, tangibly embodying a program of instructions executable by the machine to perform above described methods may be also provided.

Further features as well as the structure and operation of various embodiments are described in detail below with reference to the accompanying drawings. In the drawings, like reference numbers indicate identical or functionally similar elements.

DETAILED DESCRIPTION

Group OMP Method

Figure 1:
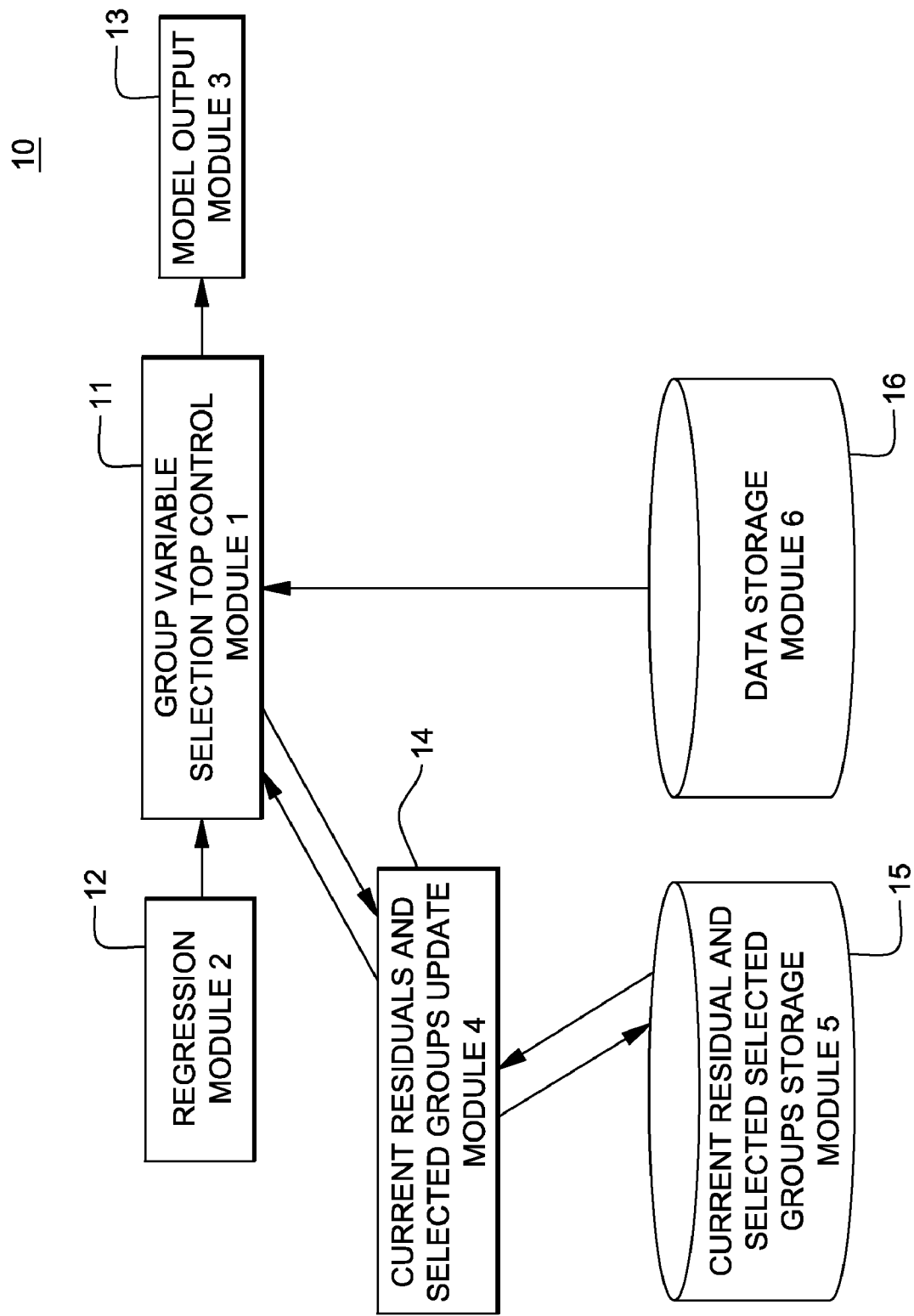
FIG. 1 is a block diagram showing the architecture of a system for variable group selection in one embodiment of the present invention.

In one embodiment, the present invention is a system and method for addressing the problem of variable selection for regression, where a natural grouping structure exists within the explanatory variables, and the goal is to select the correct group of variables, rather than the individual variables. This problem arises in many situations (e.g. in multifactor ANOVA (analysis of variance), generalized additive models, causal modeling with time series data analysis, where lagged variables belonging to the same time series may form a natural group, gene expression analysis from micro-arrays data, where genes belonging to the same functional cluster may be considered as a group). In these settings, selecting the right groups of variables is often more relevant to the subsequent use of estimated models, which may involve interpreting the models and making decisions based on them.

The aforesaid prior art methods proposed to address the variable group selection problem, in the context of linear regression and, the aforesaid method based on extending the Lasso formulation by modifying the $l_l$ penalty to account for the group structure, and relying on certain assumptions on the nature of the data, for example linearity. Hence the resulting results were not necessarily robust to cases in which such assumptions are violated.

The present invention provides a host of efficient and effective solutions to the problem of grouped variable selection that improve upon the existing methods with respect to some of these aspects, by significantly extending and improving a number of existing methods for related data modeling problems.

For example, one of the inventive methods is obtained by extending an existing method of signal recovery in the field of signal processing into the problem of group variable selection. Specifically, in one embodiment of the method, referred to herein as "group orthogonal matching pursuit" algorithm (Group-OMP), the forward greedy variable selection algorithm (OMP) is extended to make use of variable grouping information.

Empirical evaluation indicates the performance of Group-OMP favorably compares to the existing methods, namely Group Lasso, OMP and Lasso algorithms, both in terms of the accuracy of prediction and that of variable selection.

Additionally, mathematical proof is provided such that, under certain conditions, Group-OMP can identify the correct (groups of) variables when the sample size tends to infinity. An upper bound on the difference between the estimated regression coefficients and the true coefficients may be provided.

Consider the general regression problem $y = X\bar{\beta} + \mu$, where $y \in R^n$ is the response vector, $X = [f_1, \ldots, f_d] \in R^{n \times d}$ is the matrix of variable vectors $f_j \in R^n, \bar{\beta} \in R^d$ is the coefficient vector and $\mu \in R^n$ is the noise vector. It is assumed that the noise components $\mu_i, i=1,\ldots,n$, are independent Gaussian variables with mean 0 and variance $\sigma^2$.

For any $G \subset \{1, \ldots, d\}$ let $X_G$ denote the restriction of X to the set of variables, $\{f_j, j \in G\}$, where the columns $f_j$ are arranged in ascending order. Similarly for any vector $\beta \in R^d$ of regression coefficients, denote $\beta_G$ its restriction to $G$, with reordering in ascending order. Suppose that a natural grouping structure exists within the variables of X consisting of J groups $X_{G_1}, \ldots, X_{G_J}$ where $G_j \subset \{1, \ldots, d\}, G_i \cap G_j$ is the empty set for $i \neq j$ and $X_{G_j} \in R^{n \times d_j}$. Then, the above regression problem can be decomposed with respect to the groups, i.e., $$y = \sum_{j=1}^{J} X_{G_j} \bar{\beta}_{G_j} + \mu,$$

where $\bar{\beta}_{G_j} \in R^{d_j}$. Furthermore, to simplify the exposition, assume that each $X_{G_j}$ is orthonormalized, i.e., $X_{G_j}^T X_{G_j} = I_{d_j}$. Given $\beta \in R^d$ let $\text{supp}(\beta) = \{j : \beta_j \neq 0\}$. For any G and $v \in R^n$, denote by $\hat{\beta}_X(G,v)$ the coefficients resulting from applying ordinary least squares (OLS) with non-zero coefficients restricted to $G$, i.e., $\hat{\beta}_X(G,v) = \text{argmin}_{\beta \in R^d} \|X\beta - v\|_2^2$ subject to $\text{supp}(\beta) \subset G$.

Figure 2:
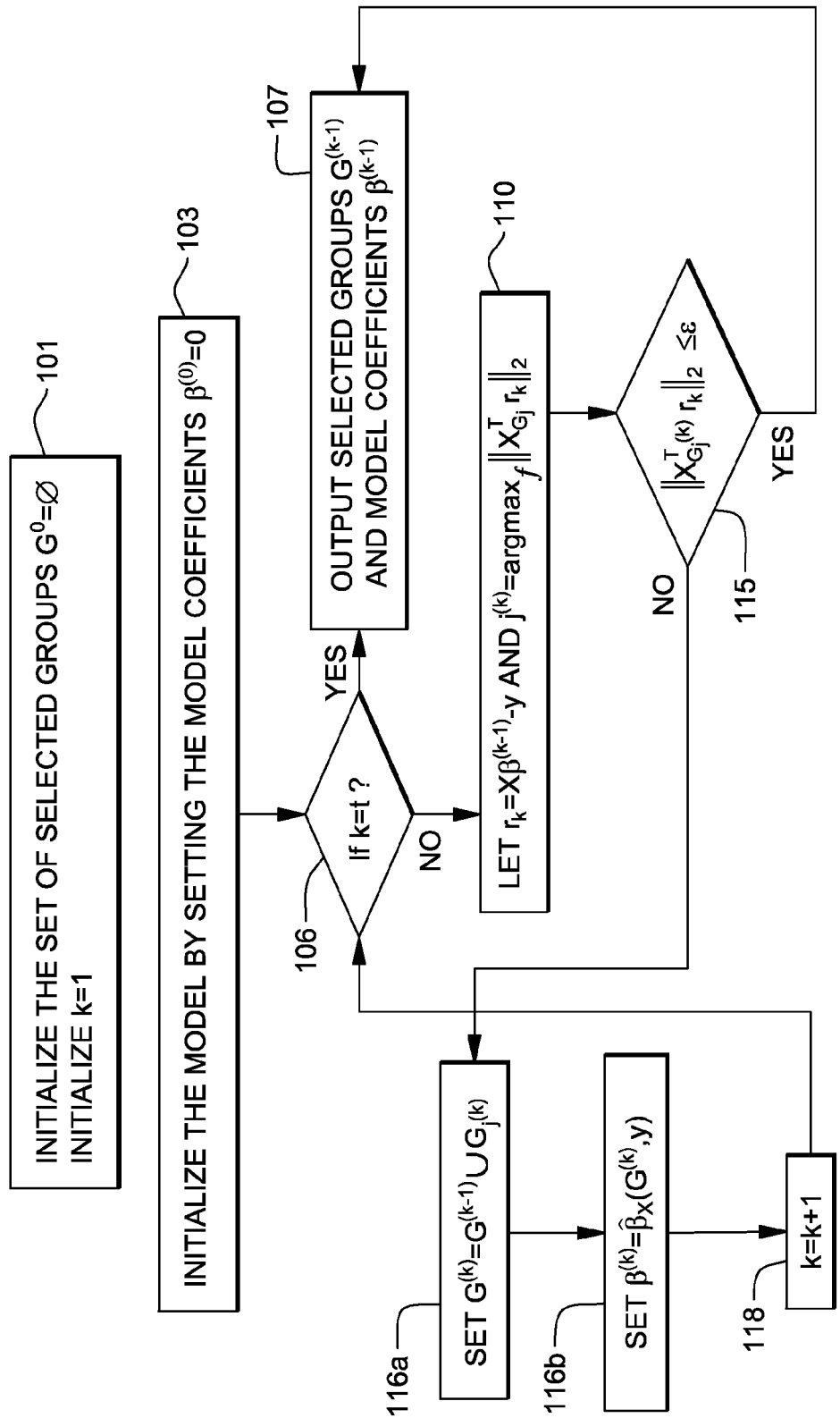
FIG. 2 is a flow diagram showing the logic of a method in one embodiment for variable group selection, for example, implemented on the system shown in FIG. 1.

Given the above regression problem setup, the Group-OMP procedure that extends the OMP procedure to deal with group selection is now described with respect to FIGS. 1 and 2.

FIG. 1 depicts a system diagram of the components implementing the inventive method of the invention. The system 10 is a computer-implemented system including a control module 11 (also referred to as module 1, such as implementing one or more microprocessor(s) or like processing unit(s)), a regression module 12 (module 2), a model output module 13 (module 3), a current residuals and selected groups update module 14 (module 4), a current residual and selected groups storage module 15 (module 5), and the data storage module 16 (module 6) for storing all of the data, data structures, intermediate processing results, etc.

FIG. 2 depicts a flow chart directed to a methodology 100 for performing group variable selection using temporal causal modeling methods according to a first embodiment. The steps indicated in method 100 are implemented by the computer system 10 of FIG. 1.

In a first step 101, FIG. 2, there is performed, at control module 11, first receiving and initializing selected variable groups, G, and an initialization of an iteration number "k". Further at step 103, there is performed a first initialization of the model coefficients, $\beta$ at control module 11. Additionally, as indicated at step 106, control module 11 makes a determination as to whether the number of iterations has reached the maximum allowed number of iterations, represented by variable "t" previously specified as input. If the condition is satisfied, then the method proceeds to step 107 in which the selected groups $G^{(k-1)}$ and the model coefficients $\beta^{(k-1)}$ are output via model output module 31. Otherwise, if the number of iterations k has not reached the maximum allowed number of iterations, the method proceeds to step 110, in which the data matrix (X) is retrieved from the data storage module 16 and the current residuals and selected groups update module 14 in cooperation with the current residual and selected groups storage module 15 computes the current residuals $r_k$, which represent the difference between the predicted values (by the current model up until the current iteration) and the actual values of the response variable (y). These modules further select the group $j^{(k)}$ that maximizes the projection of the data that corresponds to the group in question, i.e. the columns in the data that correspond to the group in question, onto the residuals. This projection of the data onto the residuals refers to the L-2 norm of the product between the transposed data matrix for the variables in the variable group in question and the current residual vector. Then at step 115, implementing the data storage module 16 and control module 11, there is performed checking whether the residual $r_k$ is small enough, i.e., less than some error threshold value "$\epsilon$" and if so it proceeds to step 107. Otherwise, the method proceeds to step 116a, 116b, 118. Step 116a performs updating the groups selected so far to include the new selected group, i.e., $G^{(k)} = G^{(k-1)} \cup G_{j^{(k)}}$ implementing the current residuals and selected groups update module 14 in cooperation with the current residual and selected groups storage module 15. In updating the selected groups step 116a, $G^{(k)}$ is the set of selected groups up to iteration k, $G^{(k-1)}$ is the set of selected groups up to iteration k-1 and $G_{j^{(k)}}$ is the group that has just been selected at step 110. Further, at Step 116b, a regression is performed using the variables in an input data matrix that correspond to the groups selected so far (i.e., $G^{(k)}$) using an arbitrary component regression method such that the model coefficients, i.e., $\beta^{(k)} = \hat{\beta}_X(G^{(k)}, y)$ are updated using the regression module 12 and data storage module 16. The iteration number k is then updated by the control module 11 at step 118. After performing steps 116a, 116b, 118, the process returns to step 106 for the next iteration (or output).

Note that the procedure as described in FIG. 2 selects the best group in each iteration, with respect to reduction of the residual error, and it then re-estimates the coefficients, $\beta^{(k)}$. In a further embodiment, the re-estimation step 116b is optional and may be skipped. It is the re-estimation step that distinguishes the present embodiment of the invention for variable group handling from standard boosting-like procedures.

Note that the procedure as described in FIG. 2 selects the best group in each iteration, with respect to reduction of the residual error, and it then re-estimates the coefficients, $\beta^{(k)}$. In a further embodiment, it is possible to skip the re-estimation step (step 116b), and in this case, the estimation of the coefficients is performed by computing the coefficients of the variables in the variable group selected in the current iteration only, so as to minimize the residual error computed using the coefficients estimated in earlier iterations for the variable groups selected in those earlier iterations. In contrast, for the case when the re-estimation step is implemented, the coefficients of all of the variables in the variable groups selected up to the current iteration are re-estimated so as to minimize the residual error. It is the re-estimation step that distinguishes the present embodiment of the invention for variable group handling from standard boosting-like procedures.

Temporal Causal Modeling with Group OMP

An important class of problems to which this inventive method can be applied is that of temporal causal modeling, namely the problem of identifying causal relationships between multiple time series data, giving rise to a system and method of according to a further embodiment, namely, temporal causal modeling using group OMP as a component method of group variable selection.

The method for temporal causal modeling using group OMP implements the notion of "Granger Causality" (Granger, C. W. J. (1969). "Investigating causal relations by econometric models and cross-spectral methods". Econometrica 37: 424-438.) which is an operational notion of causality in time series analysis, e.g., in the area of econometrics. It is based on the intuition that a cause should necessarily precede its effect, and in particular that if a time series variable causally affects another, then the past values of the former should be helpful in predicting the future values of the latter, beyond what can be predicted based solely on their own past values.

More specifically, a time series x is said to "Granger cause" another time series y, if the accuracy of regressing for y in terms of past values of y and x is statistically significantly better than that of regressing just with past values of y.

Thus, in the method, let $\{x_t\}_{t=1}^T$ denote the time series variables for x and $\{y_t\}_{t=1}^T$ denote the time series variables for y. The so-called Granger test first performs the following two regressions in equations 1) and 2):

$$y_t \approx \sum_{j=1}^{d} a_j y_{t-j} + \sum_{j=1}^{d} b_j x_{t-j} \qquad (1)$$

$$y_t \approx \sum_{j=1}^{d} a_j y_{t-j} \qquad (2)$$

where d is the maximum "lag" allowed in past observations and then applies an F-test, or some other statistical test, to determine whether or not (1) is more accurate than (2) with a statistically significantly advantage.

The notion of Granger causality, as introduced above, was defined for a pair of time series. The system and method according to this farther embodiment handles cases in which there are many time series variables present and it is desired to determine the causal relationships between them. For this purpose, a graphical modeling over time series data is performed to determine conditional dependencies between the temporal variables, and obtain insight and constraints on the causal relationships between the time series.

A particularly relevant class of methodology is those that apply regression algorithms with variable selection to determine the neighbors of each variable. That is, one can view the variable selection process in regression for y, in terms of $y_{t-1}, \ldots, y_{t-d}, x_{t-1}, \ldots, x_{t-d}, z_{t-1}, \ldots, z_{t-d}$, etc., as an application of the Granger test on y against x, z, etc. By extending the pair-wise Granger test to one involving an arbitrary number of time series, it makes sense to say that x Granger causes y, if $x_{t-l}$ is selected for any time lag l in the above variable selection.

An important point that should be considered in designing graphical Granger modeling methods is the following: answering the question whether there exists any time lag l such that $x_{t-l}$ provides additional information for predicting $y_t$. Emphatically, the question is not, whether for a particular lag l, $x_{t-l}$ provides additional information for predicting $y_t$. That is, as a method of graphical Granger modeling, the relevant variable selection question is not whether an individual lagged variable is to be included in regression, but whether the lagged variables for a given time series, as a group, are to be included. Thus, implementation of graphical Granger modeling methods should take into account the group structure imposed by the time series in the variable selection process. Regression techniques are implemented for performing the group variable selection.

For example, one method that can be used is a "group Lasso" method, which performs variable selection with respect to loss functions that penalize intra-group and inter-group variable inclusion differently. In the method of temporal causal modeling, use is made of the Group OMP algorithm and its variants as the variable group selection sub-module, which is more flexible when dealing with non-linear regression models.

It is noted that, with the specific way the group variable selection procedure is incorporated in the method, the non-linearity being dealt with is within the respective groups (time series). That is, models of the type $y_t \approx f(y_{t-1}, \ldots, y_{t-d}) + g(x_{t-1}, \ldots, x_{t-d}) + h(z_{t-1}, \ldots, z_{t-d})$, etc., are considered where f, g, h, . . . may be non-parametric functions (e.g. trees).

Figure 3:
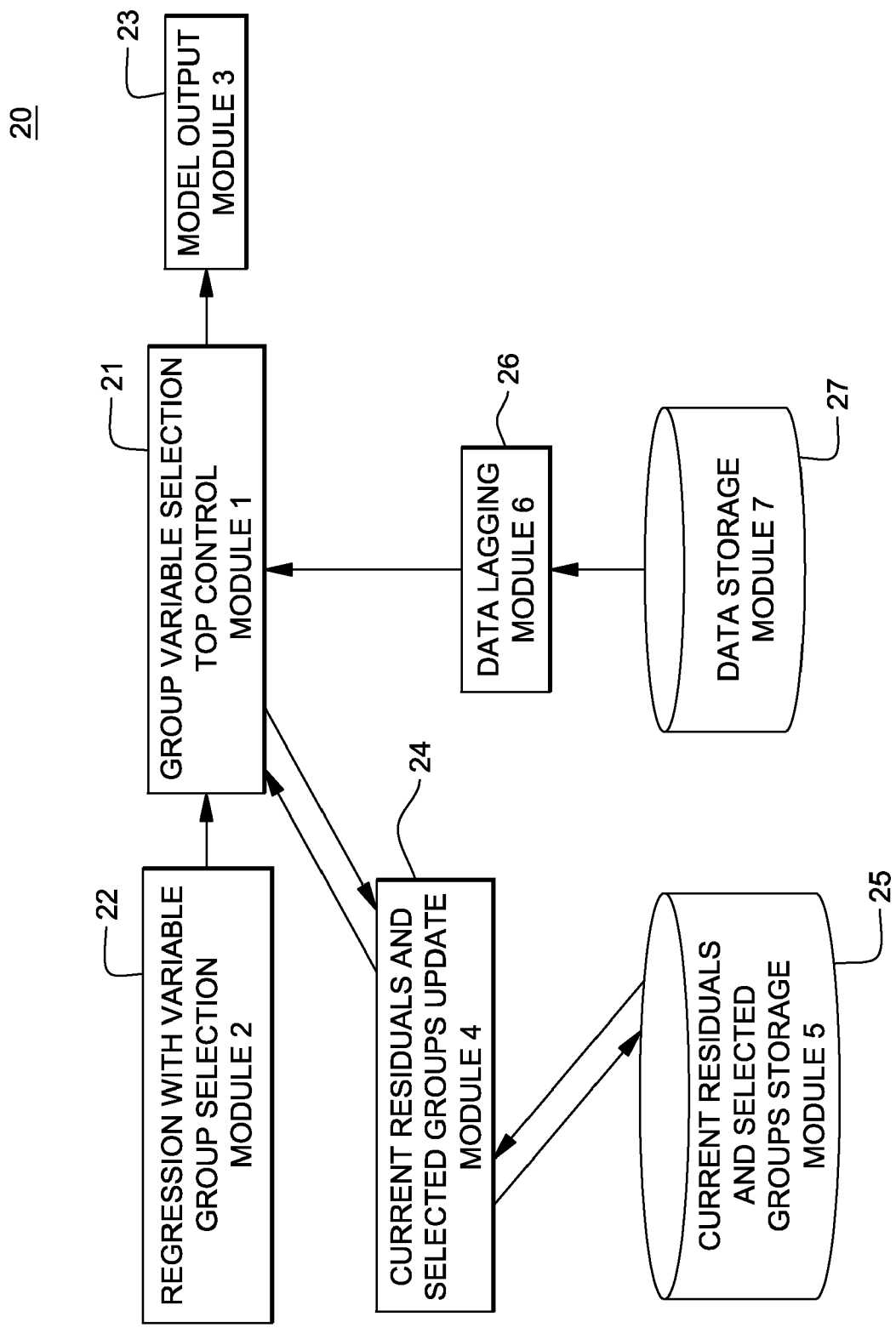
FIG. 3 is a block diagram showing the architecture of a system for temporal causal modeling in one embodiment of the present invention.
Figure 4:
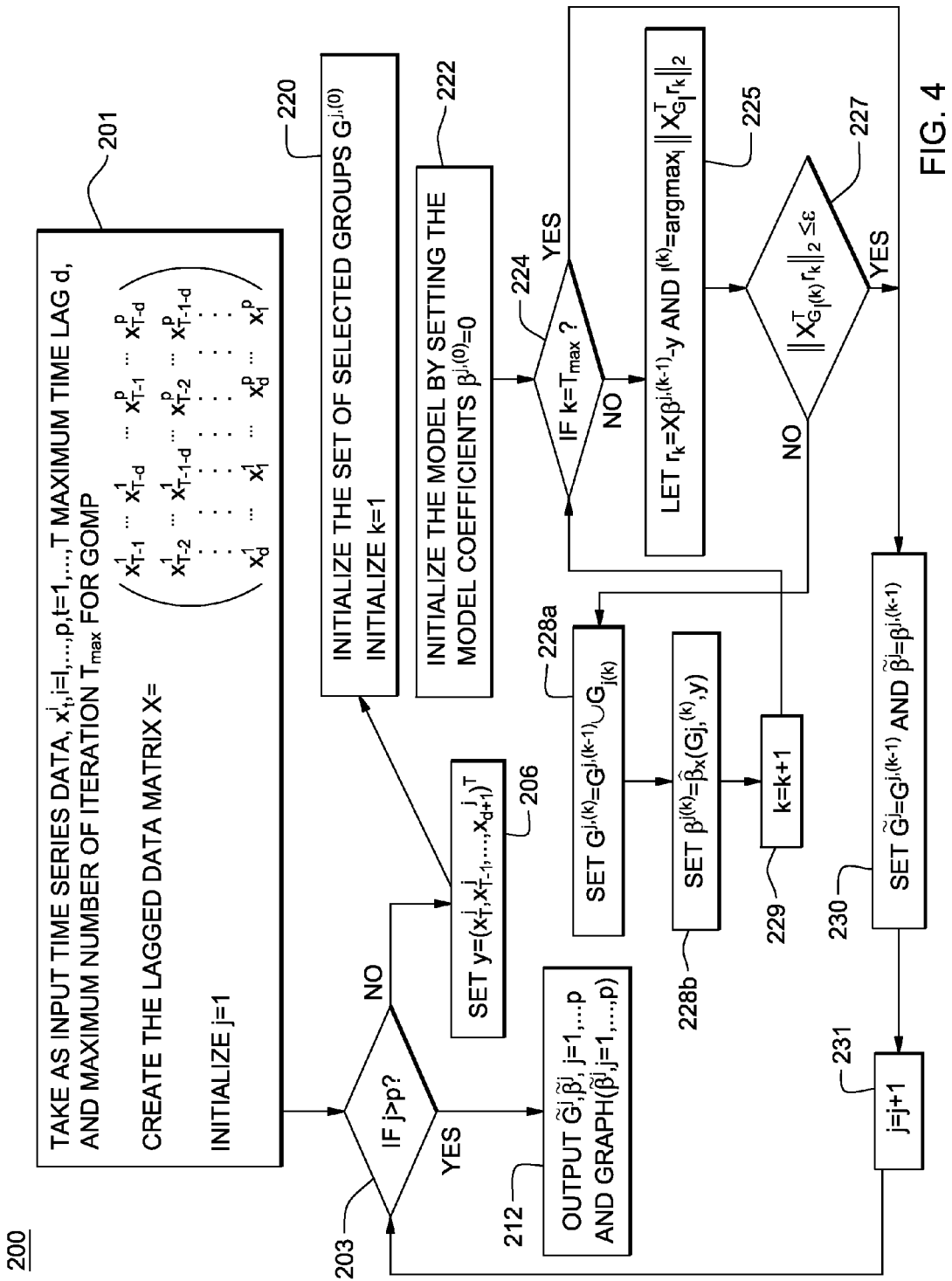
FIG. 4 is a flow diagram showing the logic of a method in one embodiment for temporal causal modeling, for example, implemented on the system shown in FIG. 3.

The foregoing argument leads to the generic procedure of grouped graphical Granger modeling method, exhibited in FIGS. 3, and 4. In the FIG. 3, the variable $x^j$ denotes a feature (or time series) for any j, and $x_t^j$ the lagged variable at time t for $x^j$.

FIG. 3 particularly depicts a block diagram showing the architecture of a computer-implemented system 20 for spatial temporal causal modeling in one embodiment. The system of FIG. 3 implementing the inventive method comprises the control module 21 (module 1), a regression with variable group selection module 22 (module 2), a model output module 23 (module 3), the current residuals and selected groups update module 24 (module 4), the current residual and selected groups storage module 25 (module 5), a data lagging module 26 (module 6) and a data storage module 27 (module 7).

FIG. 4 depicts a flow chart directed to the methodology 200 for performing temporal causal modeling according to a further embodiment. The steps indicated in method 200 are implemented by the computer-implemented system 20 of FIG. 3.

In a first step 201, FIG. 4, the control module 21 implemented by the computing system including the processor(s) and associated memory storage unit(s) first receives as input time series data represented as $x_t^i = 1, \ldots, p, t = 1, \ldots, T$ (time series data is any data consisting of a series of values recorded at multiple times steps, etc.), a maximum time lag data value, "d", and a maximum number of iterations value, $T_{max}$. Then, the current residual and selected groups storage module 25 and a data lagging module 26 creates a lagged data matrix X, represented generally as $$X = \begin{pmatrix} x_{T-1}^1 & \cdots & x_{T-d}^1 & \cdots & x_{T-1}^p & \cdots & x_{T-d}^p \\ x_{T-2}^1 & \cdots & x_{T-1-d}^1 & \cdots & x_{T-2}^p & \cdots & x_{T-1-d}^p \\ \vdots & \vdots & \vdots & \vdots & \vdots & \vdots & \vdots \\ x_d^1 & \cdots & x_1^1 & \cdots & x_d^p & \cdots & x_1^p \end{pmatrix}$$

Control module 23 further initializes the index, "j" that represents the target time series feature under consideration. The method proceeds to step 203 where control module determines whether all of the features have been considered. If it is determined that all features have been considered, the method proceeds to step 212 and the model output module 23 outputs the selected groups, model coefficients, and the causal graph computed using the groups and coefficients. For example, such a graph may be computed by adding an edge between two time series going from the first to the second, just in case the second time series is selected as group in the call to the regression with variable selection process comprising steps 220 through 229, for the first time series as the target feature, that is, chosen as "y" in step 206.

Figure 7:
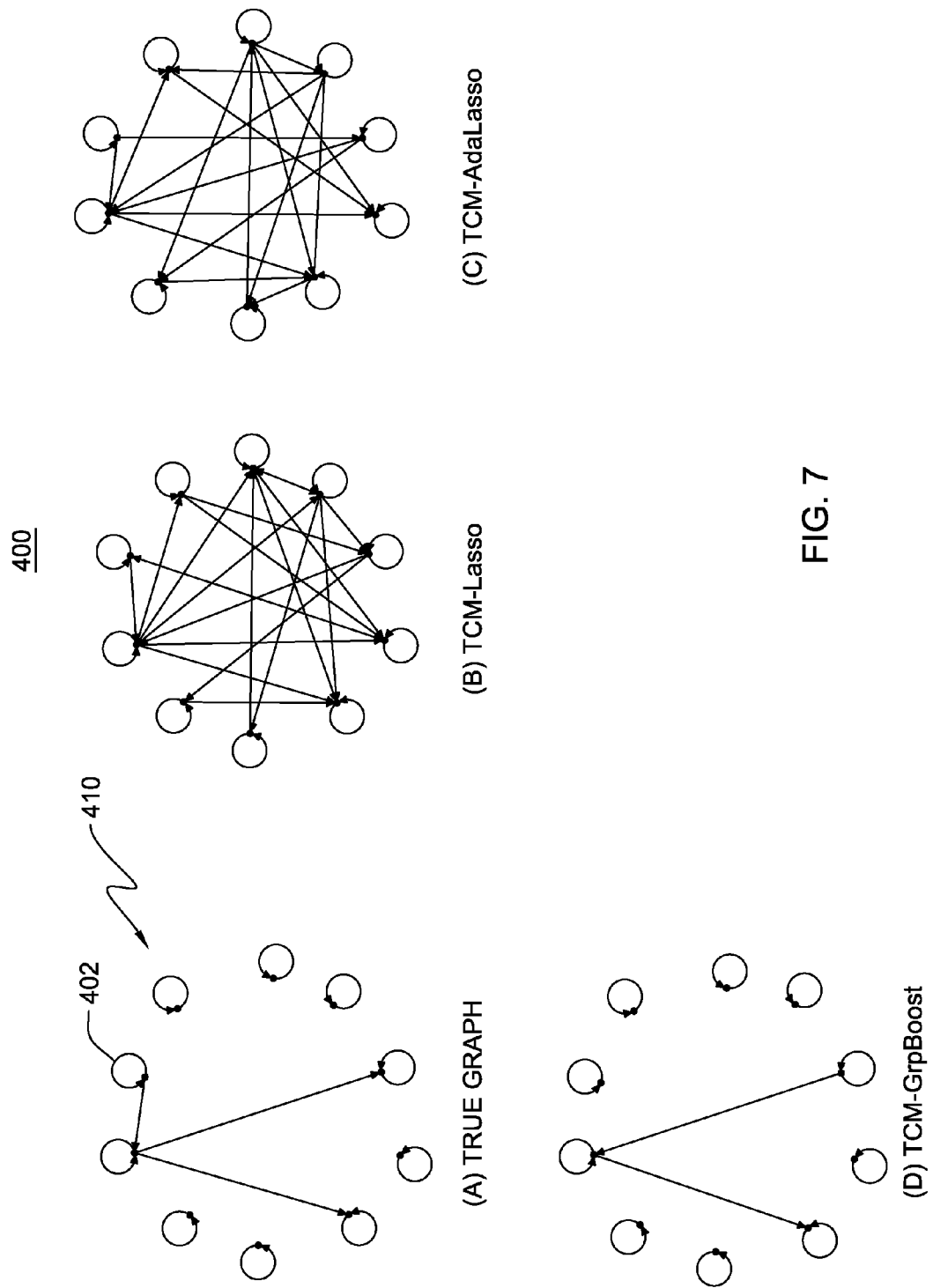
FIG. 7 exhibits a number of example output causal models to illustrate the process implemented by an embodiment of the invention.

The first and second time series refer to the two time series for which it is considered whether to put in an "edge" in the causal graph. It is understood that a causal graph is a graph in which the nodes correspond to the time series, and it is considered whether to place an edge from the first to the second time series in question. An example causal graph is depicted in FIG. 7 described below.

Returning to steps 203, if it is determined that all of the variables of the input data have not been considered, then the process proceeds to step 206 where the time series for the current target index, j, is set to y according to:

$$y = (x_T^j, x_{T-1}^j, \ldots, x_{d+1}^j)^T$$

Continuing, steps 220 to 229 of method are implemented which are identical to the method 100 described herein above with respect to FIG. 2, namely the "group-OMP" method. Thus, step 220, FIG. 4, there is performed, at control module 21, a first receipt and initialization of selected groups, G, and an initialization of an iteration number "k". Further at step 222, there is performed a first initialization of the model coefficients, β at control module 21. Additionally, as indicated at step 224, regression module 22 makes a determination as to whether the number of iterations has reached the maximum allowed number of iterations, represented by previously specified variable "$T_{max}$". If the condition is satisfied, then the method proceeds to step 230 where the control module 21 updates the selected groups and model coefficients for the current feature under consideration, i.e., $\tilde{G}^j = G^{(j,(k-1))}$ and $\tilde{\beta}^j = \beta^{j,(k-1)}$. The process proceeds to step 231 where the feature index, j, is incremented and the procedure returns to step 203 for the next iteration. Otherwise, returning to step 224, if it is determined that the number of iterations has not reached the maximum allowed number of iterations, the method proceeds to step 225, in which the data matrix (X) is retrieved and the regression module 22 and the data lagging module 26 computes the current residuals $r_k$, which represent the difference between the predicted values (by the current model up until the current iteration) and the actual values of the response variable (y). These modules further select the group $l^{(k)}$ that maximizes the projection of the corresponding data onto the residuals. Then continuing at step 227, implementing the regression module 22, there is performed checking whether the residual $r_k$ is small enough, i.e., less than some error threshold value "$\epsilon$" and if so it proceeds to steps 230 and 231. Otherwise, the method proceeds to step 228a, 228b and 229. Step 228a implements the regression with variable group selection module 22, data lagging module 26 and data storage module 27 to perform updating the groups selected so far to include the new selected group, i.e., $G^{j,(k)}$. Further, at Step 228b, a regression is performed using the variables in an input data matrix that correspond to the group selected so far using an arbitrary component regression method such that the model coefficients, i.e., $\beta^{j,(k)}$ are updated using the regression module 22 and data lagging module 26. The iteration number k is then updated by the control module 21 at step 229. After performing steps 228a, 228b, 229, the process returns to step 224 for the next iteration.

Spatial Temporal Causal Modeling with Group OMP

Many real world modeling problems involve data that are spatial in nature, in addition to time series data. For example, climate data modeling, geographical modeling, etc, are but a few examples of such applications. The problem of determining causal relationships between spatial temporal series is an important task in such modeling problems. In order to formulate this problem, use is made of the Granger causality notion extended into this spatial temporal setting, defined in terms of the following two regressions:

$$y_{t,s} \approx \sum_{\omega \in \Omega} \sum_{l=1}^{L} a_{t,\omega} y_{t-l,s+\omega} + \sum_{\omega \in \Omega} \sum_{l=1}^{L} b_{l,\omega} x_{t-l,s+\omega} y_{t,s}$$

$$\approx \sum_{\omega \in \Omega} \sum_{l=1}^{L} a_{l,\omega} y_{t-l,s+\omega}$$

The above scheme is symmetric with respect to time and space, but there is a difference between space and time that calls for a refinement of this formulation.

Now analogously to the case for temporal causal modeling, the question to be solved is whether an entire series $\{x_{t-l,s+\omega}^{j}\}$, $l \in \{1, \ldots L\}$, $\omega \in \Omega$, where s is the location in question, l is the time lag, w is the spatial lag and, provides additional information for the prediction of $x_{t,s}^{i}$, (where "i" is the index of the feature/time series) and not whether for specific time and spatial lags l, $\omega$, $x_{t-l,s+\omega}^{j}$ provides additional information for predicting $x_{t,s}^{i}$. Therefore, an instantiation of Granger causal modeling, in the context of spatial-temporal modeling, takes into account the group structure imposed by the spatial-temporal series into the fitting criterion that is used in the variable selection process.

In a further aspect of the invention the system and method, referred to as "group elastic net", that addresses the issue of "grouping" the lagged variables for the same feature, and that of the smoothness desired for the spatial dimension.

Let S be the set of (interior) locations s such that for each $\omega \in \Omega$, $s+\omega$ is a point of the grid (and not outside the grid). Let, $t=1, \ldots, T$ be the time points considered. For a given measurement $x^i$ (i is the index of the feature) the following penalized regression model may be used to determine which spatial-temporal series $x^j$ (j=1, \ldots, N) Granger-cause $x^i$.

$$\hat{\beta} = \text{argmin}_\beta \sum_{s \in S} \sum_{t=L+1}^{T} \left( x_{t,s}^i - \sum_{j=1}^{N} \sum_{l=1}^{L} \sum_{\omega \in \Omega} \beta_{l,\omega}^j x_{t-l,s+\omega}^j \right)^2 +$$

$$\lambda_2 \sum_{j=1}^{N} \sum_{l=1}^{L} (\beta_{l,:}^j)^T \tilde{\Delta}_j \beta_{l,:}^j + \lambda_1 \sum_{j=1}^{N} \|\beta_{:}^j\|_{\Delta_j},$$

where $\beta_{l,:}^j = \text{vect}(\beta_{l,\omega}^j)_{\omega \in \Omega}$, $\beta_{:}^j = \text{vect}(\beta_{l,\omega}^j)_{l=(1,\ldots,L), \omega \in \Omega}$, $\Delta_j = \text{diag}(\tilde{\Delta}_j, \ldots, \tilde{\Delta}_j)$ and $\|y\|_{\Delta_j} = (y^T \Delta_j y)^{1/2}$.

The role of the "spatial penalty" is to enforce spatial regularization. Specifically the matrix $\tilde{\Delta}_j$ is meant to enforce spatial smoothness as well as some form of distance-based coefficient decay. Namely the regression coefficients are penalized more as they correspond to increasingly distant neighborhood locations. For instance, $\tilde{\Delta}_j$ could be a diagonal matrix such that the diagonal entry corresponding to $\beta_{l,\omega}^j$ equals $\|\omega\|$.

The Group Elastic Net problem is transformed into a group variable selection problem under a certain data transformation. In a non-limiting example, it is assumed that $\Delta_j$ (j=1, \ldots N) is positive definite; and, let $\Delta_j = S_j^T S_j$. Let $A_j = (S_j^T S_j)^{-1} S_j^T$ and $C = \text{diag}(A_1, \ldots, A_N)$ where A and C are matrices to be used to transform the Group elastic net problem into a group lasso problem and then retrieve the group elastic net solution from the group lasso solution. The Group Elastic Net problem solution $$\beta_{GEN} = \text{argmin}_\beta \|Y - X\beta\|^2 + \lambda_2 \sum_{j=1}^{N} \|\beta^j\|_{\Delta_j}^2 + \lambda_1 \sum_{j=1}^{N} \|\beta^j\|_{\Delta_j}$$

can be obtained by solving the Group Lasso problem, $$\beta_{GL} = \text{argmin}_\beta \|\hat{Y} - \hat{X}\beta\|^2 + \gamma \sum_{j=1}^{N} \|\beta^j\|^2,$$

where $$\gamma = \frac{\lambda_1}{\sqrt{1+\lambda_2}}, \quad \hat{Y} = \begin{pmatrix} Y \\ 0_{(p)} \end{pmatrix}, \quad \hat{X} = \frac{1}{\sqrt{1+\lambda_2}} \begin{pmatrix} XC \\ \sqrt{\lambda_2} I \end{pmatrix}$$

and where p is the number of columns of X, and setting $$\beta_{GEN}^j = \frac{1}{\sqrt{1+\lambda_2}} \Delta_j^{-1} S_j^T \beta_{GL}^j.$$

Figure 5:
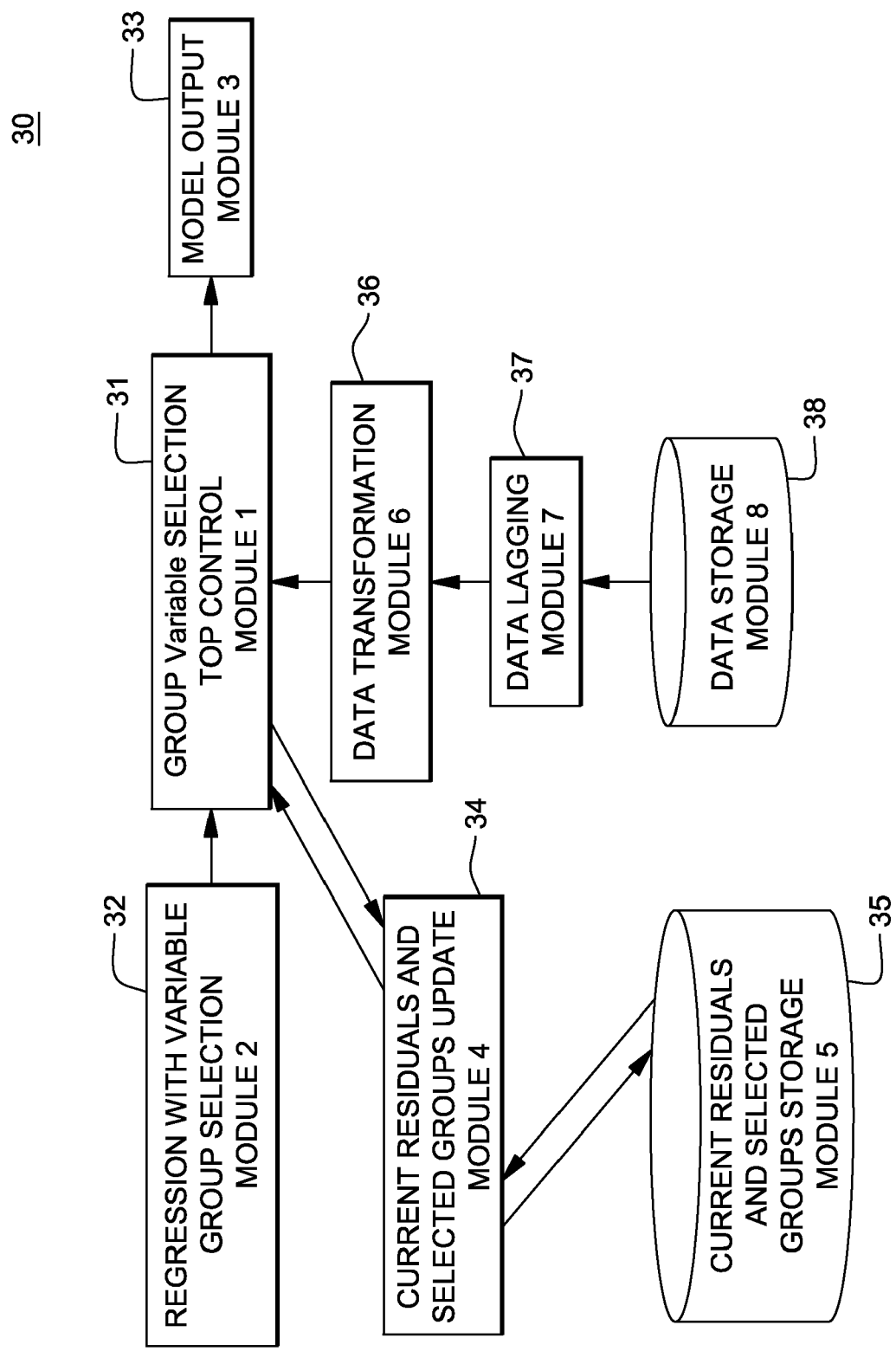
FIG. 5 is a block diagram showing the architecture of a system for spatial temporal causal modeling in one embodiment of the present invention.

FIG. 5 is a block diagram showing the architecture of a system for spatial temporal causal modeling in one embodiment of the present disclosure.

By referring to the block diagram of FIG. 5, a computer-implemented system 30 for spatial temporal causal modeling comprises a control module 31 (module 1), the regression with variable group selection module 32 (module 2), the model output module 33 (module 3), the current residuals and selected groups update module 34 (module 4), the current residual and selected groups storage module 35 (module 5), and a data transformation module 36 (module 6), the data lagging module 37 (module 7) and the data storage module 38 (module 8).

Figure 6:
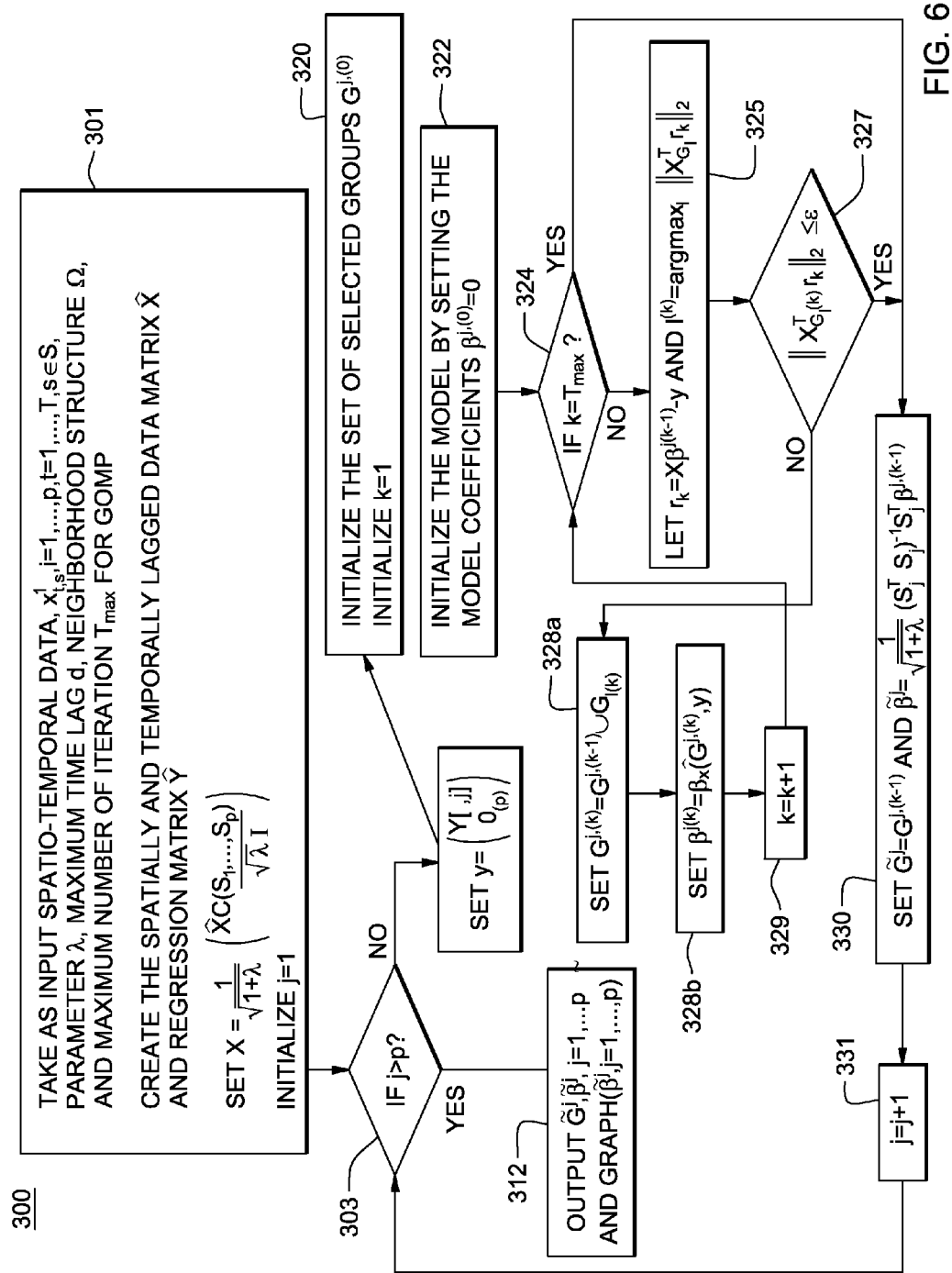
FIG. 6 is a flow diagram showing the logic of a method in one embodiment for spatial temporal causal modeling, for example, implemented on the system shown in FIG. 5.

FIG. 6 is a flow diagram showing the logic of a method 300 in one embodiment for spatial temporal causal modeling, for example, implemented on the computer-implemented system shown in FIG. 5.

In FIG. 6, a method of spatial temporal causal modeling includes first receiving at step 301 as input to the computing system including processor units and associated memory storage, spatio-temporal data, e.g. $x_{t,s}^i$, t=1, ..., p, t=1, ..., T, s∈S, a regularization parameter, a maximum time lag value, a neighborhood structure, and a maximum number of iterations value for processing in a sub-procedure implementing, for example, the Group-OMP. The processing includes generating a spatio-temporally lagged data matrix and the regression matrix, and then applying a data transformation to the lagged data matrix as specified by the following equation $$X = \frac{1}{\sqrt{1+\lambda_2}} \begin{pmatrix} \hat{X}C \\ \sqrt{\lambda_2} I \end{pmatrix}, \quad Y = \begin{pmatrix} \hat{Y} \\ 0_{(p)} \end{pmatrix},$$

where C=diag($A_1$ ..., $A_N$) and then an index j that represents the target spatio-temporal feature under consideration is initialized. At step 303, there is performed checking whether all of the features have been considered. If all of the features have been considered, the process proceeds to step 312 and outputs the selected groups of $\tilde{G}^j$ model coefficients $\hat{\beta}^j$, and the causal graph computed using the said groups and coefficients. For example, such a graph may be computed by adding an edge between two spatio-temporal series just in case the second series is selected as group in the call to the regression with variable selection process, comprising steps 320 through 329, for the first series as the target feature.

Returning to step 303, if it is determined that all of the features have not been considered, the process applies a data transformation to a target data column of the regression matrix at 315 and as described below as an example. Then the process runs steps 320 through 329 that are identical to the method described herein above.

Thus, step 320, FIG. 6, there is performed, at control module 31, a first receipt and initialization of a set (e.g., one or more) of selected groups, $G^{j,(0)}$, and an initialization of an iteration number "k". Further at step 322, there is performed a first initialization of the model coefficients, $\beta^{j,(0)}$ at control module 31. Additionally, as indicated at step 324, regression module 32 makes a determination as to whether the number of iterations has reached the maximum allowed number of iterations, represented by previously specified variable "$T_{max}$". If the condition is satisfied, then the method proceeds to step 330 where the control module 31 causes updating the selected groups and scales the model coefficients for the current feature under consideration, i.e., $\tilde{G}^j = G^{j,(k-1)}$ and $$\tilde{\beta}^j = \frac{1}{\sqrt{1+\lambda}} (S_j^T S_j)^{-1} S_j^T \beta^{j,(k-1)}.$$

The process proceeds to step 331 where the feature index, j, is incremented and the procedure returns to step 303 for the next iteration. Otherwise, returning to step 324, if it is determined that the number of iterations has not reached the maximum allowed number of iterations, the method proceeds to step 325, in which the data matrix (X) is retrieved and the regression module 32 and the data lagging module 36 computes the current residuals $r_k$, which represent the difference between the predicted values (by the current model up until the current iteration) and the actual values of the response variable (y). These modules further select the group $1^{(k)}$ that maximizes the projection of the corresponding data onto the residuals. Then continuing at step 227, implementing the regression module 32, there is performed checking whether the residual $r_k$ is small enough, i.e., less than some error threshold value "ϵ" and if so it proceeds to steps 330 and 331. Otherwise, the method proceeds to step 328a, 328b and 329. Step 328a implements the regression with variable group selection module 32, data lagging module 37 and data storage module 38 to perform updating the groups selected so far to include the new selected group, i.e., $G^{j,(k)}$. Further, at 328b, a regression is performed using the variables in an input data matrix that correspond to the group selected so far using an arbitrary component regression method such that the model coefficients, i.e., $\beta^{j,(k)}$ are updated using the regression module 32 and data lagging module 36. The iteration number k is then updated by the control module 31 at step 329. After performing steps 328a, 328b, 329, the process returns to step 324 for the next iteration.

With respect to the applied data transformation, the method includes applying the variable group selection method to the problem of modeling a target time series in terms of the past values of all the time series, such that a) the data for the target variable are expanded by concatenating a vector of zeros whose size equals the number of lagged explanatory variables; and b) the data for the explanatory variables are first multiplied by a certain matrix that controls the spatial decay behavior of the regression coefficients and expanded by a constant times the identity matrix; and c) the said variable group selection method is applied to the resulting transformed data; and d) the estimated regression coefficients are scaled by multiplying by a matrix that bears a certain relationship to the said spatial decay matrix; and e) the data transformation is such that the solution of the transformed problem is equivalent to the solution to the problem of minimizing the squared residuals plus a certain penalty terms that encourage spatial smoothness of the regression coefficients and sparsity of selected variable groups. The data transformation transforms the "group elastic net" formulation, which has separate treatment of spatial and temporal aspects, into a simpler formulation of "group Lasso problem", which does not embed such separate treatments. Hence, the mathematical transformation allows an efficient solution to a more difficult problem by reducing it to a simpler problem and using a solution for it.

Experimental Evaluation

The performance of the methods described herein have been empirically evaluated and verified that they significantly improve upon the existing methods with respect to various measures of performance.

Experiments on Group-OMP

For illustrative, non-limiting purposes, a description of experiments and results for the Group-OMP method follows. The performance of Group-OMP was compared against a number of comparison methods OMP, Group Lasso, Lasso and OLS (Ordinary Least Square). Comparison with OMP will test the effect of "grouping" OMP, while Group Lasso is included as a representative existing method of group variable selection. The performance of these methods is compared in terms of the accuracy of variable selection, variable group selection and prediction. As measure of variable (group) selection accuracy a measure $F_1$ is used, which is defined as $$F_1 = \frac{2PR}{P+R},$$

where P denotes the precision and R denotes the recall. For computing variable group $F_1$ for a variable selection method, a group is considered to be selected if any of the variables in the group is selected. As measure of prediction accuracy, a model error is used, defined as Model error=$(\hat{\beta}-\bar{\beta})^T E(X^T X)(\hat{\beta}-\bar{\beta})$, where are the true model coefficients and $\hat{\beta}$ the estimated coefficients. Lasso technique solves $\text{argmin}_\beta \|Y-X\beta\|^2 + \lambda\|\beta\|_1$, and Group Lasso $$\text{argmin}_\beta \|Y - X\beta\|^2 + \lambda \sum_{j=1}^{J} \|\beta_{G_j}\|_2.$$

So the tuning parameter for Lasso and Group Lasso is the penalty parameter $\lambda$. For Group-OMP and OMP, rather than parametrizing the models according to precision $\epsilon$, the systems and methods described herein uses iteration number (i.e. a stopping point). Two example estimates are considered: the "oracle estimate" and the "holdout validated estimate". For the oracle estimate, the tuning parameter is chosen so as to minimize the model error. Note that such estimate can only be computed in simulations and not in practical situations, but it is useful for evaluating the relative performance of comparison methods, independently of the appropriateness of the complexity parameter, as it gives a lower bound on the achievable model error. The holdout-validated estimate is a practical version of the oracle estimate, obtained by selecting the tuning parameter by minimizing the average squared error on a validation set.

An experimental setup of the simulation experiments is now described.

Experiment 1: An additive model with continuous variables taken from a reference to Yuan, M., Lin, Y., entitled "Model selection and estimation in regression with grouped variables", J. R. Statist. Soc. B, 68, 4967, 2006 (model III), where the groups correspond to the expansion of each variable into a third-order polynomial. Consider variables $Z_1, \ldots, Z_{17}$, with $Z_i$ independent and identically distributed according to a Normal distribution with mean 0 and unit standard deviation. Let $W_1, \ldots, W_{16}$ be defined as $W_i = (Z_i + Z_{17})/\sqrt{2}$. The true model is $$Y = W_3^3 + W_3^2 + W_3 + \frac{1}{3}W_6^3 - W_6^2 + \frac{2}{3}W_6 + \eta,$$

where $\eta$ is Gaussian with mean 0 and standard deviation equal to 2. Then let the explanatory variables be $(X_{3(i-1)+1}, X_{3(i-1)+2}, X_{3i}) = (W_i^3, W_i^2, W_i)$ with the variable groups $G_i = \{3(i-1)+1, 3(i-1)+2, 3i\}$ $i=1, \ldots, 16$. There were 100 runs, each with 100 observations for training and 50 for validation.

Experiment 2: An additive model with continuous variables. Consider three independent hidden variables $Z_1, Z_2, Z_3$ each having a normal distribution with zero mean and unit standard deviation. Consider 40 predictors defined as: $X_i = Z_{\lfloor (i-1)/3 \rfloor+1} + \mu_i$ for $i=1, \ldots, 15$, where $\mu_i$ are independent and identically distributed according to a Gaussian with zero mean and standard deviation $\sigma=\sqrt{0.1}$, and $X_i$ normally distributed with zero mean and unit variance for $i=16, \ldots, 40$. The true model is $$Y = 3\sum_{i=1}^{5} X_i + 4\sum_{i=6}^{10} X_i + 2\sum_{i=11}^{15} X_i + \eta$$

where $\eta$ had a Gaussian distribution with zero-mean and standard deviation $\sigma=15$ and the groups are $G_k = \{5(k-1)+1, \ldots, 5k\}$, for $k=1, \ldots, 3$ and $G_k = k+12$, for $k>3$. In this example, there was 100 runs, each with 500 observations for training and 50 for validation.

The results of the two experiments are presented in Table 1. It is noted that $F_1$(Var) and $F_1$(Group) are identical for the grouped methods for Experiment 1, since here the groups have equal size. Overall, Group-OMP performs consistently better than all the comparison methods, with respect to all measures considered. In particular, Group-OMP does better than OMP not only for variable group selection, but also for variable selection and predictive accuracy. Against Group-Lasso, Group-OMP does better in all four experiments with respect to variable (group) selection when using Oracle, while it does worse in one case when using holdout validation. Group-OMP also does better than Group-Lasso with respect to the model error in three out of the four experiments.

TABLE 1

Average F1 score at the variable level and group level, and model error with standard error, for the models output by Ordinary Least Squares, Lasso, OMP, Group Lasso, and Group-OMP.

|  | Exp 1 | Exp 2 |
| --- | --- | --- |
| F1 (Var) | | |
| OLS | 0.222 ± 0 | 0.545 ± 0 |
| Lasso (Oracle) | 0.541 ± 0.010 | 0.771 ± 0.007 |
| Lasso (Holdout) | 0.528 ± 0.015 | 0.758 ± 0.015 |
| OMP (Oracle) | 0.787 ± 0.009 | 0.532 ± 0.004 |
| OMP (Holdout) | 0.728 ± 0.013 | 0.477 ± 0.006 |
| Group Lasso (Oracle) | 0.449 ± 0.011 | 0.693 ± 0.005 |
| Group Lasso (Holdout) | 0.459 ± 0.016 | 0.706 ± 0.013 |
| Group-OMP (Oracle) | 0.998 ± 0.002 | 0.999 ± 0.001 |
| Group-OMP (Holdout) | 0.921 ± 0.012 | 0.918 ± 0.011 |
| F1 (Group) | | |
| OLS | 0.222 ± 0 | 0.194 ± 0 |
| Lasso (Oracle) | 0.346 ± 0.008 | 0.494 ± 0.011 |
| Lasso (Holdout) | 0.340 ± 0.014 | 0.547 ± 0.029 |
| OMP (Oracle) | 0.808 ± 0.020 | 0.224 ± 0.004 |
| OMP (Holdout) | 0.721 ± 0.025 | 0.421 ± 0.026 |
| Group Lasso (Oracle) | 0.449 ± 0.011 | 0.317 ± 0.006 |
| Group Lasso (Holdout) | 0.459 ± 0.016 | 0.364 ± 0.018 |
| Group-OMP (Oracle) | 0.998 ± 0.002 | 0.998 ± 0.001 |
| Group-OMP (Holdout) | 0.921 ± 0.012 | 0.782 ± 0.025 |
| ME | | |
| OLS | 7.063 ± 0.251 | 19.592 ± 0.451 |
| Lasso (Oracle) | 1.099 ± 0.067 | 9.228 ± 0.285 |
| Lasso (Holdout) | 1.309 ± 0.080 | 12.987 ± 0.670 |
| OMP (Oracle) | 1.052 ± 0.061 | 19.006 ± 0.443 |
| OMP (Holdout) | 1.394 ± 0.102 | 28.246 ± 1.942 |
| Group Lasso (Oracle) | 0.867 ± 0.052 | 11.538 ± 0.370 |
| Group Lasso (Holdout) | 1.047 ± 0.075 | 14.979 ± 0.538 |
| Group-OMP (Oracle) | 0.379 ± 0.035 | 6.727 ± 0.252 |
| Group-OMP (Holdout) | 0.605 ± 0.089 | 12.553 ± 1.469 |

Experiments on Temporal Causal Modeling with Group-OMP

There was further conducted systematic experimentation using synthetic data in order to test the performance of the methods of group graphical Granger modeling, primarily against that of the non-grouped variants. The experiments are categorized into two types, depending on whether the data are generated using a linear model, or a non-linear model.

As models for linear data generation, there was employed the Vector Auto-Regressive (VAR) models. The VAR model is a special class of time series graphical models with linear Gaussian models used as the component models of conditional densities. Specifically, letting $X_t$ denote the vector of all features at time t, a VAR model is defined as below.

$X_t = A_1 X_{t-1} + \ldots + A_d X_{t-d}$, where the A matrices are coefficient matrices over the features.

In each of the experiments, there was randomly generated an adjacency matrix over the features that determines the structure of the true VAR model, and then randomly assigned the coefficients (the $A_l$ matrices, $l=1, \ldots$ d to the edges in the graph, for each lag l. There is then applied the obtained model on a random initial vector to generate time series data $\{X_t\}_{t=1, \ldots, T}$ of a specified length T. It is worth emphasizing that the adjacency matrix is over the features, corresponding to the idea that the true causal structure is at the level of the (time persistent) features, rather than the lagged variables.

There are a number of parameters that control this process of data generation, (c.f. Arnold, A., Liu, Y. and Abe, N. (2007), Temporal causal modeling with Graphical Granger methods. Proceedings of the Thirteenth ACM SIGKDD International Conference on Knowledge Discovery and Data Mining.), some of which are listed below, along with their settings in the experiments.

The affinity, which is the probability that each edge is included in the graph, was set at 0.2; The sample size per variable per lag which is the total data size per variable per maximum lag allowed, was set at 10. The coefficients of the VAR model were sampled according to a normal distribution with mean 0 and standard deviation 0.25, the noise standard deviation was set at 0.1, and so was the standard deviation of the initial distribution.

As non-linear models for data generation, the so-called additive non-linear Vector Auto-Regressive (VAR) models were employed. In particular, sums of polynomials of degree 3 were used in the experiments (e.g. $y_t = a(x_{t-1}^1)^2 + b(x_{t-2}^1)^4 + d(x_{t-1}^3) + \ldots$) and sums of sines and cosines (e.g. $y_t = a \cos x_{t-1}^1 + b \sin x_{t-4}^t + c \sin x_{t-2}^2 + \ldots$). The same process of random generation, as well as control and fixed parameters, was used in the non-linear case as in the linear case. For convenience the aforementioned models as "polynomial VAR'" and "sinusoidal VAR" were referred to.

The performance of all methods was evaluated using the so-called $F_l$ measure, viewing the causal modeling problem as the classification problem of predicting the inclusion of the edges in the true graph (or the corresponding adjacency matrix).

The results of the simulation experiments are presented with Table 2 providing a summary of the results of experiments on linear data. In the table, the average $F_l$ values over 18 runs are shown, along with the standard error. These results clearly indicate that there is a significant gap in performance between TCM-GrpBoost, i.e., the described embodiment of the method of temporal causal modeling based on the group variable selection method, and its "non-grouped" counterparts.

TABLE 2

The accuracy ($F_1$) of a grouped graphical Granger method and two non-grouped graphical Granger methods on synthetic linear VAR data.

| Method | TCM-Lasso | TCM-AdaLasso | TCM-GrpBoost |
|---|---|---|---|
| Linear data | 0.62 § 0.09 | 0.65 § 0.09 | 0.91 § 0:17 |

FIG. 7 illustrates several sample output graphs 400 along with a true graph 410 which is a causal graph capturing the actual causal relationships that exist between the time series features under consideration. Each circle 402 represents a "self loop", i.e., when a feature X is causing itself (e.g. $x_{\{t-1\}} \rightarrow x_1$) In this particular instance, it is revealed how the non-grouped methods tend to over-select, whereas the grouped method manage to obtain nearly perfect graph 410.

The methodology described herein was additionally applied to the problem of gene regulatory network discovery from micro-array data. A real time course micro-array dataset (Sambo F., Di Camillo B, Torolo G. (2008) CNET: an algorithm for Reverse Engineering of Causal Gene Networks. Bioinformatics Methods for Biomedical Complex Systems Applications. 8th Workshop on Network Tools and Applications in Biology NETTAB2008. Varenna, Italy.), which consists of gene expression measurements for a human cancer cell, taken at 48 time points for a subset of 9 genes, was used. The discovered interactions were compared to those previously reported in the BioGRID database (www.thebiogrid.org). The reference to M. L. Whitfield et al. entitled "Identification of genes periodically expressed in the human cell cycle and their expression in tumors", Molecular Biology of the Cell, 2002, incorporated herein by reference describes more details on the data and experimental set up. The results are presented in Table 3 as follows.

TABLE 3

The accuracy (F1) of grouped graphical Granger Methods on time-course microarray data.

| Method | TCM-Group Lasso | TCM-GrpBoost-NL |
|---|---|---|
| Microarray data | 0.59 | 0.65 |

Figure 8:
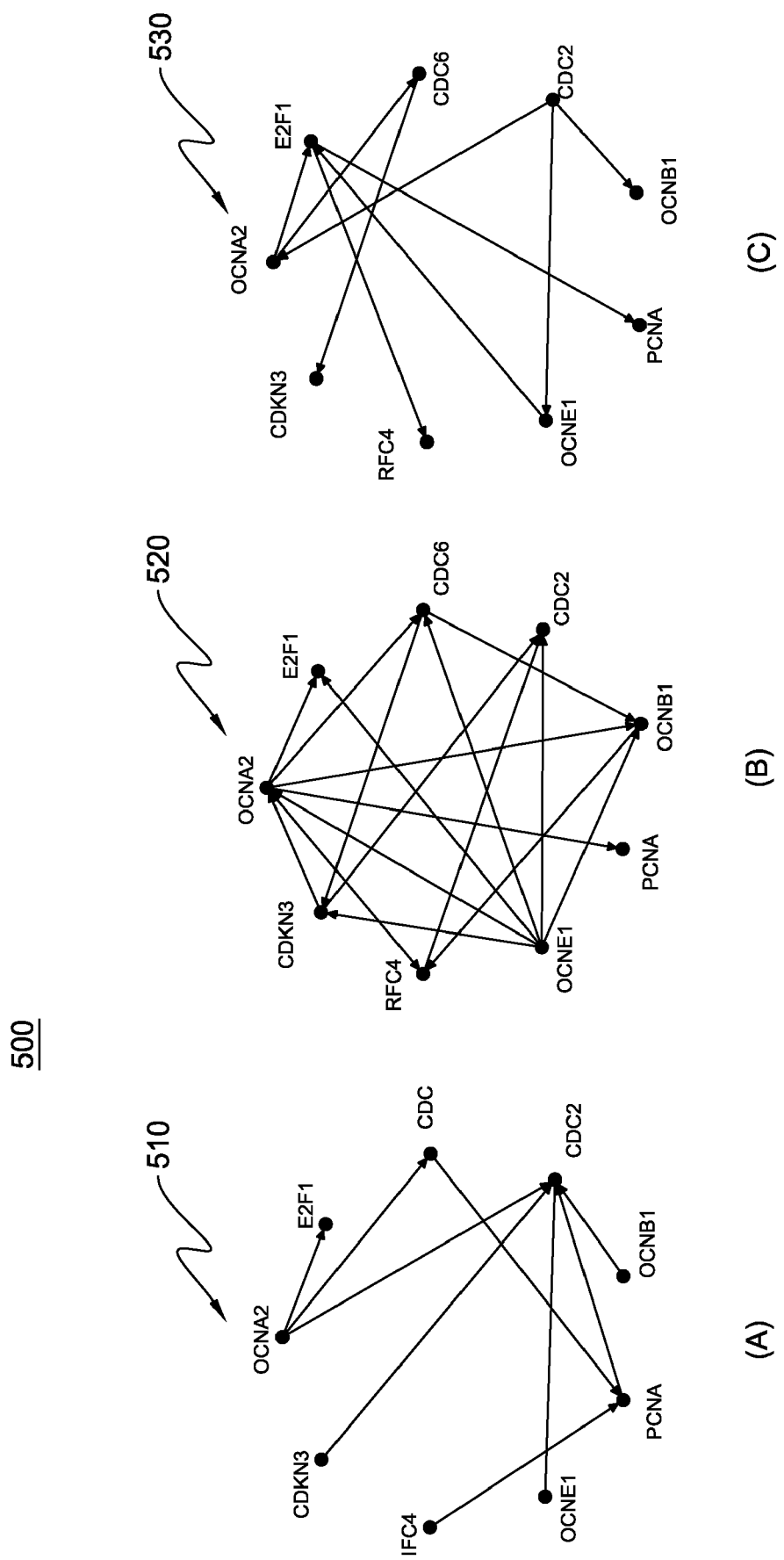
FIG. 8 exhibits a number of example output causal models for the particular application of the present disclosure to gene regulatory network discovery.

Note that the variable selection accuracy of the methods described herein is higher than that reported by previous work on the same data set ($F_1$=0.40 in (Sambo F., Di Camillo B, Torolo G. (2008) CNET: an algorithm for Reverse Engineering of Causal Gene Networks. Bioinformatics Methods for Biomedical Complex Systems Applications. 8th Workshop on Network Tools and Applications in Biology NETTAB2008. Varenna, Italy.). In addition, the methods using TCM-GrpBoost-NL leads to significantly higher accuracy than using TCM-Group Lasso, which is consistent with the non-linearity of gene interaction processes. FIG. 8 depicts causal graphs 500 output by the methods along with the reference graph 510 constructed using the BioGRID database. FIG. 8(a) exhibits the "reference" causal network 510 formed by treating the interactions reported in the BioGRID database as the true causal relationships, the graph 520 of FIG. 8(b) shows the network discovered by a group graphical Granger modeling method with Group Lasso as the sub-module for regression with variable group selection, while the graph 530 of FIG. 8(c) is the network discovered by the implementation of the present invention.

Various aspects of the present disclosure may be embodied as a program, software, or computer instructions embodied in a computer or machine usable or readable medium, which causes the computer or machine to perform the steps of the method when run on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

Figure 9:
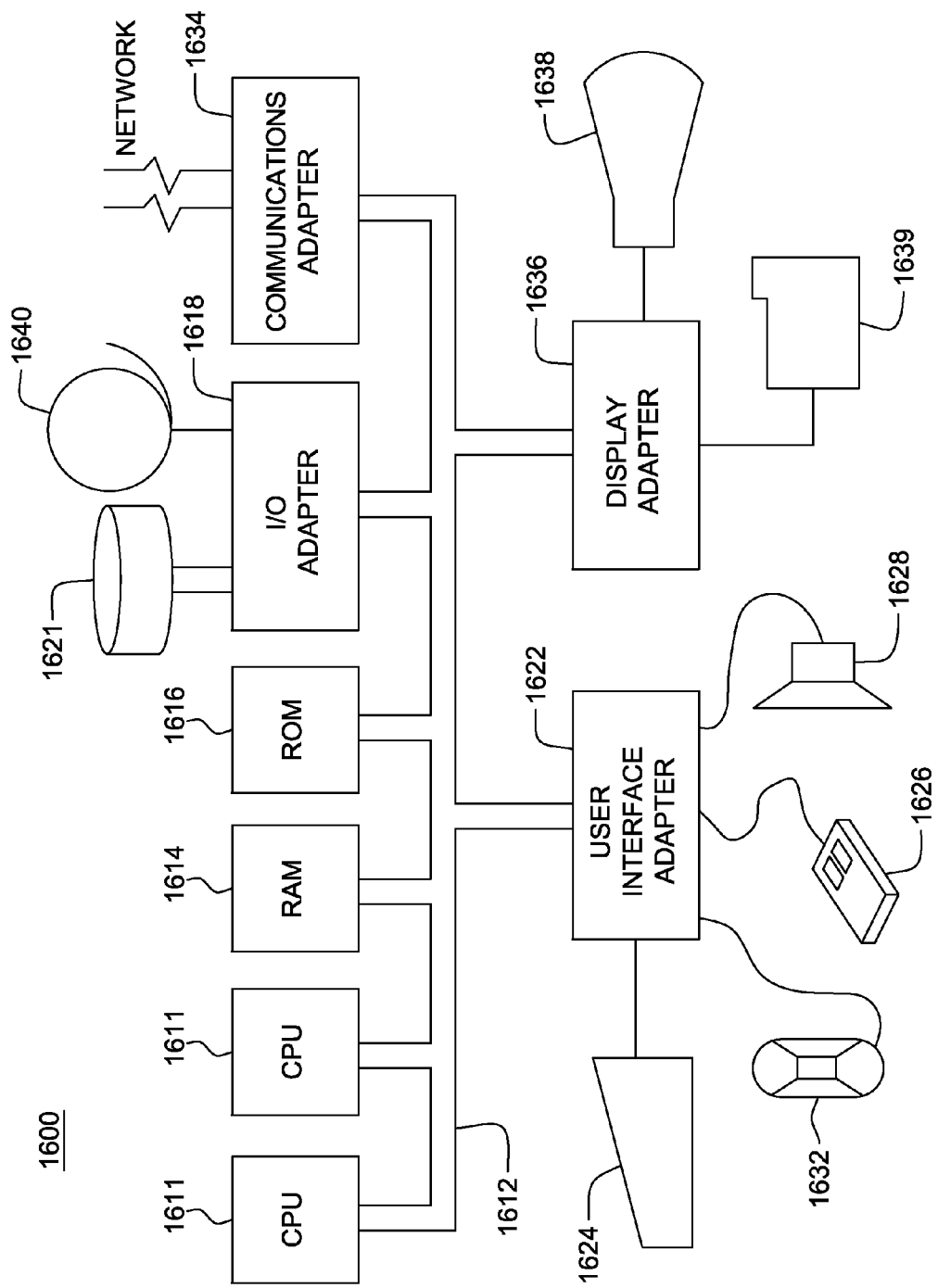
FIG. 9 illustrates a hardware configuration to implement or run the embodiments of the present invention.

FIG. 9 illustrates a hardware configuration of a computing system 1600 to implement or run the method steps in FIGS. 2, 4 and 6. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a local area network (e.g., such as a network associated with a person), etc., and a display adapter 1636 for connecting the bus 1612 to a display device 1638 and/or printer 1639 (e.g., a digital printer of the like).

In a further embodiment, the various system modules described herein with respect to FIGS. 1, 3 and 5 are implemented as hardware on a reconfigurable hardware, e.g., FPGA (Field Programmable Gate Array) or CPLD (Complex Programmable Logic Device), using a hardware description language (Verilog, VHDL, Handel-C, or System C). In another embodiment, the system modules described herein with respect to FIGS. 1, 3 and 5 are implemented on a semiconductor chip, e.g., ASIC (Application-Specific Integrated Circuit), using a semi custom design methodology, i.e., designing a chip using standard cells and a hardware description language.

In a further embodiment, the system modules described herein with respect to FIGS. 1, 3 and 5 are implemented as software using one or more programming languages, e.g., C, C++, Java, .NET, Perl, Python, etc. In one embodiment, the system modules described herein with respect to FIGS. 1, 3 and 5 are recorded in a computer readable medium, e.g., CD (Compact Disc), DVD (Digital Versatile Disc), HDD (Hard Disk Drive), SSD (Solid State Drive), as an instruction, e.g., a machine language or assembly language, that is operated by a processor, e.g., Intel® Core®, IBM® Power PC®, AMD® Opteron®.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of variable group selection comprising:
   providing at a computer device, a training data set for which a predictive model is to be generated;
   iteratively selecting from among a plurality of variables of said data set, one or more variable groups minimizing a residual error in each iteration; and
   in each iteration, selecting a variable group with respect to the minimization of residual error of an updated predictive model when the selected variable group is included in the said predictive model in addition to those variable groups that have been selected in earlier iterations; and,
   performing a regression by an arbitrary component regression method using the selected variable groups selected into the current predictive model up to the current iteration in each iteration to obtain said updated predictive model,
   wherein a program using a processor unit executes one or more said iteratively selecting and performing step.

2. The method as claimed in claim 1, further comprising, at each iteration, estimating coefficients to be used in the current estimated predictive model, by computing the coefficients of the variables in the variable group selected in the current iteration only, so as to minimize the residual error computed using the coefficients estimated in earlier iterations for the variable groups selected in those earlier iterations.

3. The method as claimed in claim 2, further comprising, upon selection of the variable groups in each iteration, re-estimating the coefficients of all of the variables in the variable groups selected into the current predictive model up to the current iteration are re-estimated so as to minimize the residual error.

4. The method as claimed in claim 2, wherein said arbitrary component regression method includes implementing a least squares method.

5. The method as claimed in claim 3, wherein said arbitrary component regression method includes implementing a least squares method.

6. A method implemented by a computer for temporal causal modeling comprising:
   a) providing, at a computer system, a data set comprising a number of time series data; and
   b) creating, from said data set, data for variables corresponding to a number of relative past time steps for each time series;
   c) grouping said variables according to a time series they belong to; and
   d) applying a variable group selection method by iteratively choosing a target time series and selecting the time series that are considered to be causing the said target time series, and, at each iteration:
   selecting from among the variables of said data set one of a plurality of variable groups minimizing a residual error in each iteration; and
   in each iteration, selecting a variable group with respect to the minimization of residual error of an updated predictive model when the selected variable group is included in said predictive model in addition to those variable groups that have been selected in earlier iterations; and, performing regression by an arbitrary component regression method using the selected variable groups selected into the current predictive model up to the current iteration in each iteration to obtain said updated predictive model, wherein a program using a processor unit executes one or more said creating, grouping, iteratively choosing and selecting and performing step.

7. The method as claimed in claim 6, wherein said creating data variable corresponding to a number of relative past time steps includes executing a method of lagging.

8. The method as claimed in claim 7, further comprising generating a predictive model wherein said the target time series is modeled in terms of the past values of all the time series.

9. The method as claimed in claim 8, further comprising generating a predictive model wherein said the target time series is modeled in terms of the past values of all the time series including the target time series itself.

10. The method as claimed in claim 6, further comprising, at each iteration, estimating coefficients to be used in the current estimated predictive model, by computing the coefficients of the variables in the variable group selected in the current iteration only, so as to minimize the residual error computed using the coefficients estimated in earlier iterations for the variable groups selected in those earlier iterations.

11. The method as claimed in claim 10, further comprising, upon selection of the variable groups in each iteration, re-estimating the coefficients of all of the variables in the variable groups selected into the current predictive model; and, up to the current iteration, are re-estimated so as to minimize the residual error.

12. The method as claimed in claim 6, wherein said arbitrary component regression method includes implementing a least squares method.

13. A method implemented by a computer for spatial temporal causal modeling comprising:
   a) providing, at a computer system, a data set comprising a number of spatial temporal data;
   b) creating, from said data set, data for variables corresponding to a number of relative past time steps and a number of relative spatial neighbors for each spatial temporal series; and
   c) grouping said variables according to the spatial temporal series they belong to; and
   d) applying a variable group selection method by iteratively choosing a target spatial temporal measurement and selecting the spatial temporal measurements that are causing the said target spatial temporal measurement, and, at each iteration:
      selecting from among the variables of said data set one of a plurality of variable groups minimizing a residual error in each iteration; and
      in each iteration, selecting a variable group with respect to the minimization of residual error of an updated predictive model when the selected variable group is included in the said predictive model in addition to those variable groups that have been selected in earlier iterations; and,
      performing regression by an arbitrary component regression method using the selected variable groups selected into the current predictive model up to the current iteration in each iteration to obtain said updated predictive model, wherein a program using a processor unit executes one or more said creating, grouping, iteratively choosing, selecting and performing steps.

14. The method as claimed in claim 13, wherein said creating data variable corresponding to a number of relative past time steps includes executing a method of spatial and temporal lagging.

15. The method as claimed in claim 13, further comprising generating a predictive model wherein said the target time series is modeled in terms of the past values of all the time series.

16. The method as claimed in claim 13, further comprising generating a predictive model wherein said the target time series is modeled in terms of the past values of all the time series including the target time series itself.

17. The method as claimed in claim 13, further comprising, at each iteration, estimating coefficients to be used in the current estimated predictive model, by computing the coefficients of the variables in the variable group selected in the current iteration only, so as to minimize the residual error computed using the coefficients estimated in earlier iterations for the variable groups selected in those earlier iterations.

18. The method as claimed in claim 17, further comprising, upon selection of the variable groups in each iteration, re-estimating the coefficients of all of the variables in the variable groups selected into the current predictive model; and, up to the current iteration, are re-estimated so as to minimize the residual error.

19. The method as claimed in 13, further comprising: at each iteration, applying a data transformation comprising:
   a) expanding data for the target variable by concatenating a vector of zeros whose size equals the number of lagged explanatory variables; and
   b) multiplying the data for the explanatory variables by a first data matrix for controlling a spatial decay behavior of regression coefficients and expanded by a constant times an identity matrix; and
   c) applying a variable group selection method to a resulting transformed data; and
   d) scaling estimated regression coefficients by multiplying by a second data matrix that bears a certain relationship to the first data matrix.

20. A computer system for variable group selection, the system comprising:
   a memory;
   a processor in communications with the computer memory, wherein the computer system is capable of performing a method comprising:
   providing a training data set for which a predictive model is to be generated;
   iteratively selecting from among a plurality of variables of said data set, one or more variable groups minimizing a residual error in each iteration; and
   in each iteration, selecting a variable group with respect to the minimization of residual error of an updated predictive model when the selected variable group is included in the said predictive model in addition to those variable groups that have been selected in earlier iterations; and,
   performing a regression by an arbitrary component regression method using the selected variable groups selected into the current predictive model up to the current iteration in each iteration to obtain said updated predictive model.

21. The system as claimed in claim 20, further comprising, at each iteration, estimating coefficients to be used in the current estimated predictive model, by computing the coefficients of the variables in the variable group selected in the current iteration only, so as to minimize the residual error computed using the coefficients estimated in earlier iterations for the variable groups selected in those earlier iterations.

22. The system as claimed in claim 21, further comprising, upon selection of the variable groups in each iteration, re-estimating the coefficients of all of the variables in the variable groups selected into the current predictive model up to the current iteration are re-estimated so as to minimize the residual error.

23. The system as claimed in claim 21, wherein said arbitrary component regression method includes implementing a least squares method.

* * * * *